3,493,239
OLEOPNEUMATIC SUSPENSIONS
Fernand Stanislas Allinquant, 53 Avenue Le Notre,
Sceaux, Hauts-de-Seine, France
Filed June 2, 1967, Ser. No. 643,159
Int. Cl. B60g 17/00
U.S. Cl. 280—6                                        7 Claims

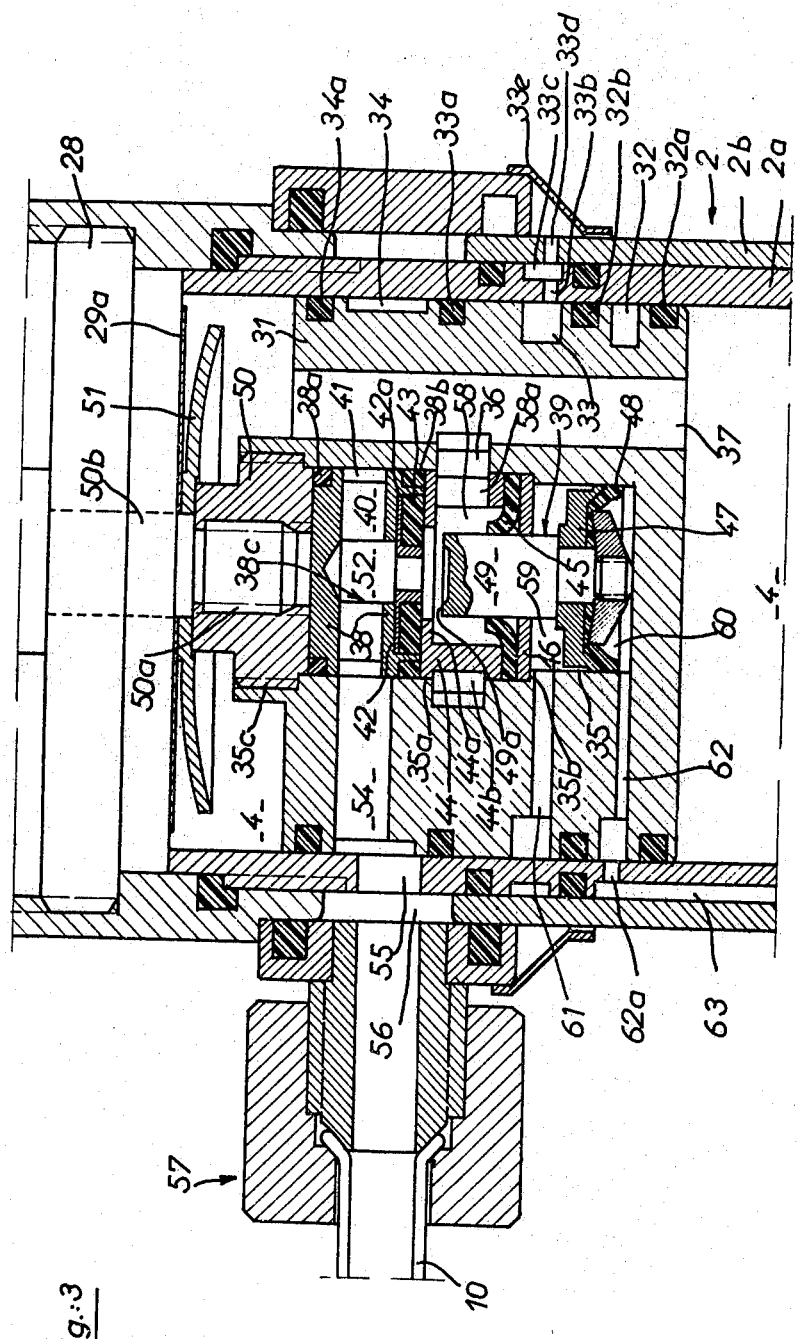

ABSTRACT OF THE DISCLOSURE

An oleopneumatic suspension device for correcting trim in a vehicle, comprising a plurality of suspension jacks whose portative power is adjusted by the intake and abstraction of fluid, each jack being provided with its own governor for the intake of fluid, which comprises a distributor connected to a source of pressurized fluid and controlled by pressure variations in a detector circuit which are brought about by variations in the length of extension of the jack.

---

The invention relates to oleopneumatic suspension devices for correcting trim, more especially in motor vehicles, and it more particularly concerns a trim-correcting device which can be incorporated in an oleopneumatic suspension jack.

Trim-correcting oleopneumatic suspension devices for motor vehicles generally comprise jacks the cylinders of which are generally fastened to the suspended mass of the vehicle, the piston rods being fastened to the non-suspended mass. The chamber of each jack cylinder above its piston contains an incompressible damping fluid, such as oil, surmounted by a compressible fluid, for example compressed air. Thus, this chamber is divided into two compartments by a transverse partition which is provided with passages of small cross-section, the opening of which is controlled by valves in order to provide a damping effect.

In certain suspension systems, the amount of compressible fluid surmounting the incompressible fluid in each jack is constant, the upper chamber of the cylinder communicating, for example, with an enclosure containing a certain amount of compressed air in a resilient bag. To correct vehicle trim, that is, to adjust the portative power of the jacks according to the vehicle load in order that the vehicle chassis may maintain a virtually constant position whatever the load, operation is effected by addition to or abstraction from the incompressible liquid in the upper chamber of each jack. In other suspension systems, on the other hand, it is the charge of incompressible fluid in the jacks which is kept constant, and trim is adjusted by abstracting from or adding to the compressible fluid.

Numerous trim-correcting devices are already known which, starting with a pressurized-fluid source, permit a supply to or drawing off from the jacks by virtue of distributor means which are outside the said jacks and which are actuated by the relative movements of the suspended and non-suspended masses of the vehicle.

The present invention makes it possible entirely to dispense with this outside distributor means, and consequently to provide a greatly simplified suspension device.

With this end in view, according to the invention, there is associated with each jack a supply distributor governed by pressure variations brought about in an auxiliary circuit (which will be called the detector circuit) by variations in distance between the suspended and non-suspended masses of the vehicle.

In a preferred embodiment of the invention, these pressure variations are brought about by the movements of the jack piston in its cylinder, these movements placing the detector circuit selectively in communication with various pressures existing in the said jack.

The supply distributor and the detector circuit are preferably incorporated in the jack, the latter thus forming an autonomous unit, which simplifies the mounting of the suspension device.

According to one feature of the invention, this supply device is combined with a drawing-off device, likewise incorporated in the jack and which intervenes when the jack exceeds a certain degree of extension.

It will be noted that such a drawing-off device is in itself already known, more especially from the present applicant's French patent specification No. 1,398,170, which relates to a jack cylinder provided with a port which is uncovered by the jack piston when the jack exceeds a certain degree of extension, and so places the upper chamber in communication with the drawing-off device. However, in known arrangements this drawing-off device is associated with a pumping system actuated by the relative movements of the suspended and non-suspended masses so as to supply the upper chamber with pressurized fluid. In the combination according to the invention, the drawing-off device forms, along with the supply distributor, an assembly which may be easily incorporated in the jack and makes possible a supply to the latter from the pressurized-fluid source, so that vehicle trim is not dependent upon oscillations of the suspended masses.

The following description with reference to the accompanying drawing, given by way of non-limitative example, will show the manner in which the invention may be carried into effect, as well as bringing out further features and advantages thereof. In the drawing:

FIGURE 3 is a view in cross-section analogous to FIGURE 2 but on a larger scale, showing in detail the distributor supplying the jack.

Figure 1:
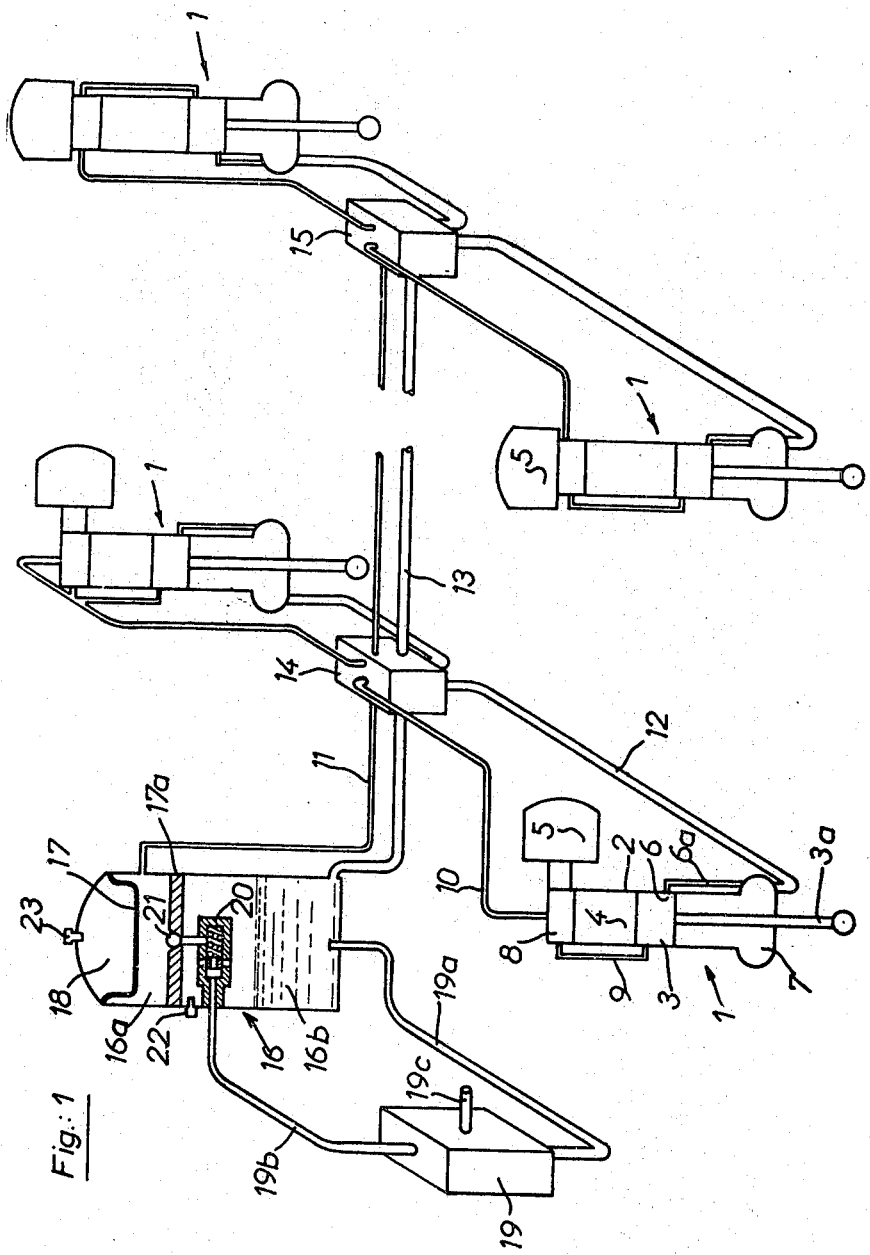
FIGURE 1 is a schematic view in perspective, showing a suspension device for a motor vehicle.

The suspension device shown in FIGURE 1 comprises four oleopneumatic jacks 1, each of which is mounted in the vicinity of one wheel. Each of the said jacks 1 comprises a cylinder 2 fastened to the chassis, in which cylinder there moves a piston 3 the rod 3a of which is fastened to the neck of a wheel axle. The cylinder chamber 4 included above the piston is filled with oil, and in its upper portion it communicates with a compressed-air pneumatic suspension spring 5. The arrangement of the jacks and their mounting is well known. It will merely be mentioned that the piston rod should be able to incline within the cylinder, so as to allow of slight horizontal irregular movements of the chassis relative to the wheels; with this in view, the rod 3a is often mounted with a swivel-joint on the piston 3.

In the wall of the cylinder 2 there is drilled a port 6 which communicates, by a duct shown diagrammatically at 6a, with the cylinder chamber 7 located beneath the piston. As will be seen from the drawing, the port 6 opens into the chamber 4 when the extension of the jack exceeds a certain limit, and the duct 6a then places the chambers 4 and 7 in communication. The upper chamber 4 is supplied with pressurized oil by a distributor 8 governed by a detector circuit shown diagrammatically at 9, these items more particularly constituting the subject of the invention and being described hereinafter.

Each of the distributors 8 communicates with a pressurized-oil collector 11 by way of a pipe 10. The lower chamber 7 of each jack communicates with an oil return collector 13 by way of a pipe 12. At 14 and 15 are shown the connecting units between the collectors 11 and 13 and the pipes 10 and 12 of the front and rear jacks respectively.

The source of pressurized oil which supplies the collector 11 is constituted by the upper chamber 16a of a reservoir 16 whose lower chamber 16b acts as a reserve of oil and communicates with the return collector 13. The upper chamber 16a is separated by a resilient wall 17 from an enclosure 18 containing compressed air, and by a fixed partition 17a from the lower chamber 16b. A gear pump 19, whose shaft 19c is rotationally driven by the vehicle motor, draws the oil contained in the chamber 16b by way of a pipe 19a and delivers it by way of a pipe 19b into the chamber 16a, with the interposition of a manostatic gate valve and of a non-return valve shown diagrammatically at 20 and 21 respectively. The manostatic valve 20 keeps the supply pressure of the chamber 16a constant by causing the pipe 19b to be placed, in a known manner, in communication with the chamber 16b when the delivery pressure of the pump exceeds a certain limit. A venting arrangement 22 automatically maintains pressure in the chamber 16b approximately at atmospheric pressure. A valve 23 makes it possible to fill the enclosure 18 with compressed air.

The general operation of the suspension is as follows: adjustment of vehicle trim is effected automatically by means of the distributors 8 which, governed by the detector circuits 9 as will be described hereinafter, abstract pressurized oil from the collector 11 so as to cause it to pass into the chamber 4 of the jacks (which, under the effect of the vehicle load, would tend to contract to a magnified degree), and also by means of the ports 6 which, in a known manner, abstract oil from the chamber 4 of the jacks (which, would tend to extend to a magnified degree) so as to cause it to pass by way of the ducts 6a into the chamber 7. Excess oil in the chamber 7 passes by way of the pipe 12 into the return collector 13. Each jack is thus maintained virtually at the length desired, due allowance being made for inertia in the operation of the various parts, vehicle trim and the height of the chassis above the ground being adjusted in this manner.

The pump 19 and the valve 20 supply the chamber 16a at a constant pressure with oil abstracted from the reserve 16b, and the chamber 16a co-operates with the enclosure 18 to form a pressure accumulator. The various elements of this arrangement are of such a size that, when the vehicle motor is running, the source 16a is always equal to supplying the collector 11 with a flow of oil at a rate sufficient to compensate for abstractions from the distributors 8, and the oil reserve 16b is always equal to receiving the flow of oil despatched from the chambers 7 back into the collector 13. It will be noted that, by virtue of this arrangement, the oil is always available in the collector 11 at a pressure which is almost invariably constant (due allowance being made more especially for temperature variations); the collector 13 and the jack chambers 7 contain oil at a pressure approximating to that of the atmosphere, but obviously slightly above it.

Figure 2:
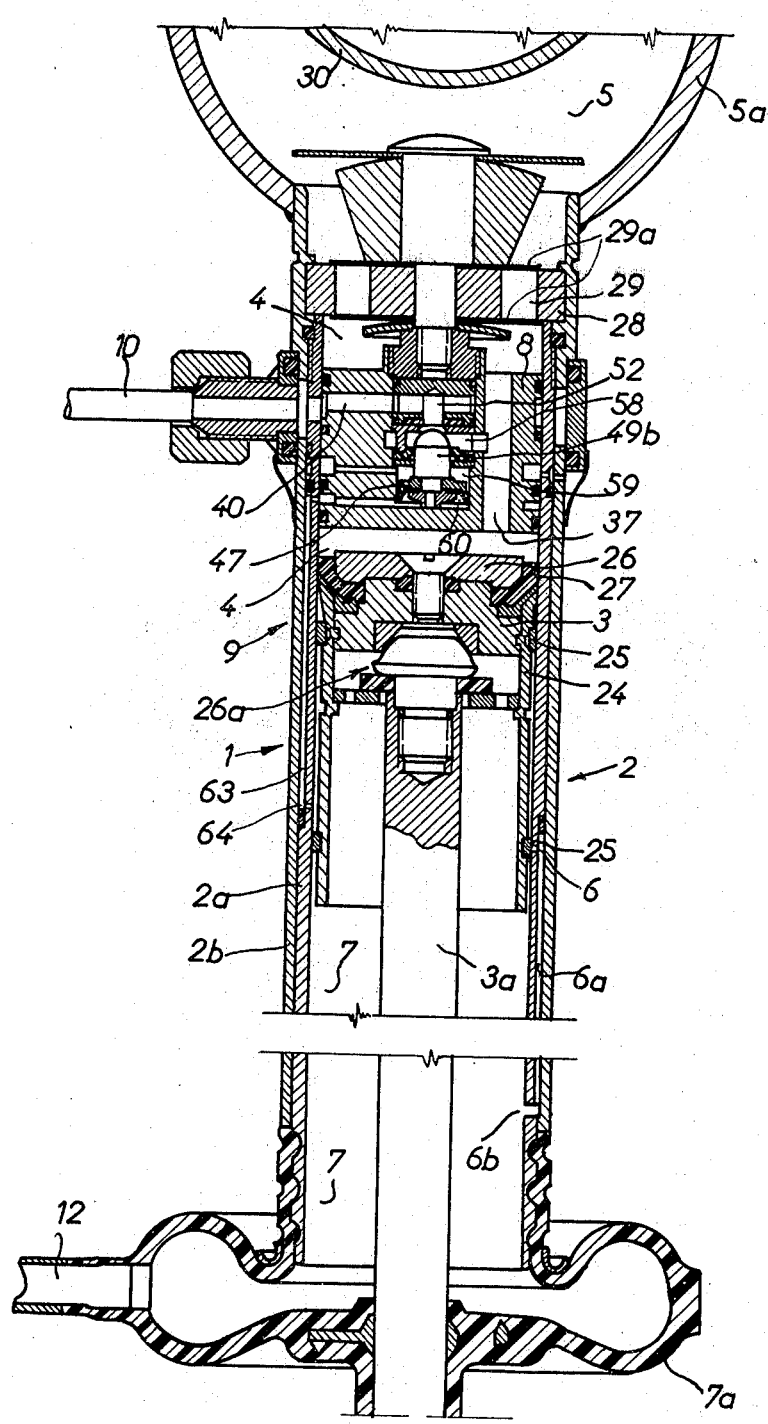
FIGURE 2 shows a suspension jack viewed in vertical cross-section.

A jack 1 is shown in greater detail in FIGURE 2. The piston 3 is constituted, in a known manner, by an assembly including a liner 24 guided inside the cylinder 2 by annular rings 25, and an end plate 26 maintaining a lipped sealing washer 27, the rod 3a being mounted on this end plate to swivel at 26a. The lower portion of the chamber 7 is constituted, in a known manner, by flexible bellows 7a which permit irregular movements of the rod 3a and into which the pipe 12 has port. In the upper portion of the chamber 4 there is provided, in a known manner, a fixed damping partition 28 pierced with orifices 29 through which the flow of oil upwards and downwards is retarded by an arrangement of valves which, in the embodiment shown, is constituted by two foils 29a. The orifices 29, controlled by the valves 29a, place the chamber 4 in communication with the pressure accumulator 5, which is constituted, in a known manner, by an enclosure containing a resilient bag 30 filled with compressed air, the space comprised between this bag and the wall 5a of the accumulator containing pressurized oil.

The cylinder 2 is formed of two contiguous and concentric walls 2a, 2b between which the duct 6a is arranged. This duct communicates at its upper portion with the port 6 and at its lower portion with an orifice 6b opening into the chamber 7. The port 6, the duct 6a and the orifice 6b act to evacuate the oil from the chamber 4 into the chamber 7 when the jack is sufficiently extended for the lipped sealing washer 27 to uncover the port 6. The principle of this arrangement is in itself well known, and is described in detail more especially in the French patent specification No. 1,398,170.

The distributor 8 and its detector circuit 9 are shown in detail in FIGURE 3. The distributor 8 is housed in a cylindrical body 31 fastened in the cylinder 2, as will be described hereinafter, slightly below the partition 28. This cylindrical body 31 includes on the outstide three annular grooves 32, 33, 34 in a tier arrangement along its vertical dimension and separated by annular sealing washers 32a, 32b, 33a and 34a which ensure fluid-tightness in the annular clearance between the body 31 and the cylinder 2. In the central portion of the body 31 there is arranged a blind bore 35 connected by a shoulder 35b to a counter-bore 35a of larger diameter and having its orifice tapped at 35c. The counter-bore 35a is provided, above the shoulder 35b, with an annular groove 36 which communicates with longitudinal perforations 37 which traverse the entire annular portion the body 31.

In these bores 35, 35a various pieces of the distributor are located, that is, a fixed piece 38 connected to the pressurized fluid supply and receiving the valve seat, a valve assembly 39 and various pieces acting to assist in their assembly.

The fixed piece 38 is cylindrical and fits in the counter-bore 35a with the interposition of annular sealing washers 38a and 38b. It is provided, on the axis of the device, with a blind perforation 38c which communicates by way of a transverse perforation 40 with an annular groove 41. The piece 38 on its lower portion includes a housing 42 which receives a bush 42a and an annular piece 43 of wear-resistant synthetic resin, for example a resin manufactured by the firm of Bayer (Leverkusen, Germany) and sold under the trademark Vulkolam. This piece 43 forms the valve seat.

The lower surface of the piece 38, of the seat 43 and of the sealing washer 38b rests on a cylindrical support 44 which fits inside the counter-bore 35a and on its upper surface includes a flange 44a whose inside diameter exceeds the inside diameter of the seat 43. This cylindrical support 44 on the outside includes an annular groove 44b intended to co-operate with the annular groove 36 of the body 31. The lower annular surface of the cylindrical support 44 rests on the peripheral portion of a lipped sealing washer 45 the object of which will be indicated hereinafter and the lower surface of which rests on a washer 46 which itself rests on the shoulder 35b.

In the bore 35 there slides a piston 47 provided with a lipped sealing washer 48, and the rod 49 of this piston slides in the central aperture of the washer 46, fluid-tightness being ensured by the lipped sealing washer 45. The upper surface of the rod 49 is dish-shaped and its margin 49a passes into the central aperture of the flange 44a and forms the valve proper which co-operates with the seat 43.

The distributor pieces are placed in position in the opposite order to which they have been described hereinbefore, and are retained in position by a threaded plug 50 which screws into the tapping 35c so as to rest on the upper surface of the piece 38 and of the sealing washer 38a.

In the embodiment shown, this plug 50 serves to fasten the piece 31 and the distributor assembly, being provided for this purpose with a tapping 50a in which is held a screw 50b having a head resting on the partition 28. In FIGURE 3 there is shown, between the plug 50 and the partition 28, a stop 51 which acts in a conventional manner to limit the opening of the lower foil 29a.

It will be seen that, when the distributor is mounted, the assembly of the bore 38c, the transverse perforation 40 and the annular groove 41 form a chamber which has been denoted overall by the reference numeral 52, the lower opening of which may be closed by the co-operation of the valve 39 with the seat 43. This chamber communicates, by the co-operation of the annular groove 41 and of a transverse perforation 54 of the piece 31, with the annular groove 34 of the latter, which itself communicates by way of a hole 55 in the wall 2a with an annular groove 56 arranged in the wall 2b of the cylinder 2. This annular groove 56 is connected to the pressurized-oil supply pipe 10 by means of a union of conventional type, represented diagrammatically at 57, which allows the pipe 10 to be connected up with the groove 56 in any position about the axis of the jack.

The inner bores of the cylindrical support 44 delimit, between the seat 43 and the lipped sealing washer 45, a chamber denoted overall by the reference numeral 58 and which communicates, by way of a transverse perforation 58a through this support 44, with the annular groove 36, which opens, as has been stated, into the longitudinal perforations 37 and consequently places the chamber 58 in comunication with the chamber 4 of the jack above and below the piece 31.

The piston 47 determines within the bore 35a an upper chamber 59 and a lower chamber 60 which are separated by the lipped sealing washer 48 so as to be fluid-tight. The chamber 59 communicates, by way of a transverse perforation 61 of the piece 31, with the annular groove 33, which itself communicates with the outside of the cylinder 2 by perforations 33b and an annular groove 33c in the wall 2a and by perforations 33d in the wall 2b, a resilient dust-cover 33e (of conventional type) preventing the ingress of dirt into the interior of the device. The chamber 60 communicates by way of a transverse perforation 62 with the annular groove 32 of the piece 31. This latter communicates by a transverse orifice 62a with a duct 63 arranged longitudinally between the walls 2a and 2b of the cylinder, this duct 63 itself communicating with the interior of the cylinder 2 by a port 64 (FIGURE 2) which is located slightly above the port 6. This combination of passages 62, 32, 62a, 63, 64 forms the detector circuit, which is denoted overall by the reference numeral 9 in FIGURES 1 and 2.

The operation of the distributor and of its detector circuit will be better understood by referring to FIGURE 2, in which the reference numerals of the various chambers have been entered, the valve 49a rigid with the piston 47 being figured diagrammatically at 49b. It has been noted that the chamber 52 communicates continuously with feed pipe 10, that the chamber 58 communicates continuously with the upper chamber 4 of the jack, that the chamber 59 communicates continuously with the atmosphere and that the chamber 60 is connected by the detector circuit to the port 64, which communicates sometimes with the lower chamber 7 of the jack (position as shown) and sometimes with the upper chamber 4, according to the position of the piston 3 in the cylinder 2. It is apparent that the chambers 52, 58 and 60 contain oil, whereas the chamber 59 contains air at atmosphere pressure.

In the position as in FIGURE 2, that is, when the lipped sealing washer 27 of the piston 3 is located above the port 64, the said port opens into the chamber 7 and the pressure in the chamber 60 is equal to the pressure of this chamber 7, which, as has already been stated, is very slightly higher than atmospheric pressure. On the other hand, if the jack extends sufficiently for the lipped sealing washer 27 to drop below the port 64, the pressure in the chamber 60 will obviously be equal to the pressure in the chamber 4 of the jack. The pressure in the chamber 60, which acts on the lower surface of the piston 47 and which will be called the "detection" pressure, is therefore sometimes equal to atmospheric pressure and sometimes equal to the pressure of the chamber 4, according as to whether the lipped sealing washer 27 is located above or below the level of the port 64.

In both cases, the combination 39 formed by the piston 47 and its rod 49 forms a differential piston which is urged upwards by the difference in the pressures of the chambers 60 and 59 acting on the piston 47, and downwards by the pressure of the chamber 52 acting and the road 49. By means of a suitable selection of the cross-sections of the bearing surface of the valve 49a formed on the upper portion of the rod, of this rod itself and of the piston 10, it is possible to arrive at an arrangement in which, in both cases, this differential piston is urged downwards so long as the "detection" pressure is equal to the draw-off pressure, and upwards when the "detection" pressure is equal to the pressure of the chamber 4.

Under these conditions, when the suspenion jack is excessively retracted, that is, when the lipped sealing washer is located above the lever of the port 64, the valve 49b opens and the chamber 4 is supplied with pressurized oil via the pipe 10, the chambers 52 and 58 and the perforations 37. On the other hand, when the jack extends sufficiently for the lipped sealing washer 27 to drop below the lever of the port 64, the detection pressure becomes equal to the pressure of the chamber 4, which urges the piston 47 upwards and brings about the closing of the valve 49b; communication between the chambers 52 and 58 is then cut, and the chamber 4 is no longer supplied with pressurized fluid.

It will be noticed that the flow-rate of fluid circulating in the detector circuit is negligible, since it corresponds solely to variations in volume of the chamber 60 due to displacements of the piston 47. There is consequently no substantial loss of charge and the "detection" pressure is practically equal first to the pressure of the chamber 4 and then to that of the chamber 7. Likewise, the flow-rate and the loss of charge are insignificant in the passages connecting the chamber 59 to the atmosphere, so that the pressure prevailing in this chamber 59 is practically equal to atmospheric pressure.

Further to clarify the arrangement with the aid of a numerical example, let is be asumed that, according to the conditions as to load in respect of the vehicle, the pressure it is required to maintain in the chamber 4 lies between 15 kg./cm.$^2$ (when the vehicle is empty) and 30 kg./cm.$^2$ (when the vehicle is loaded). The supply pressure can be adjusted to a permanent setting, by means of the monostatic valve 20, to lie between 40 kg./cm.$^2$ and 60 kg./cm.$^2$. In this event, the bearing surface of the valve 49a will, for example, be given a section of 0.3 cm.$^2$ and the piston 47 a section of 1.5 cm.$^2$; in the least favourable case (that is, in the case when the supply pressure prevailing in the chamber 52 is equal to its maximum value of 60 kg./cm.$^2$, whereas the vehicle load is such that the pressure in the chamber 4 is equal to its minimum value of 15 kg./cm.$^2$), the maximum opening force exerted on the valve will therefore be equal to $0.3 \times 60 = 18$ kg., and the minimum closing force exerted on the piston will equal $15 \times 1.5 = 22.5$ kg., so that the valve will close as soon as the detection pressure reaches the value of the pressure of equilibrium in the chamber 4, that is, as soon as the lipped sealing washer 27 drops below the port 64.

Conversely, whatever the internal pressure of the jack, the valve 49b remains open and consequently the chamber is supplied with pressurized fluid so long as the detection circuit 60, 62, 63 is in communication with the draw-off device, that is, so long as the lipped sealing washer 27 is above the port 64.

On the other hand, in case of a decrease in the vehicle load and an increase of pressure in the chamber 4 through a temperature rise, given that this chamber 4 is placed in communication with the draw-off device, in the manner already explained, as soon as the lipped sealing washer 27 drops below the port 6, it will be appreciated that the jack tends to maintain a mean position of equilibrium lying between the levels of the ports 6 and 64, which are intentionally slightly staggered so as to avoid too frequent and inopportune an operation either of the draw-off or of the supply mechanism when the jack is slightly oscillating about its position of equilibrium.

What is claimed is:

1. An oleopneumatic suspension jack comprising a main cylinder adapted to be secured to a non-suspended portion of a vehicle; a main piston operating in the main cylinder and within the latter defining a compression chamber and a hydraulic-fluid return chamber designed to be connected to a return reservoir; a piston rod mounted on the main piston in the return chamber and having one free end designed to fasten to a non-suspended portion of the vehicle; a damping partition fastened to the main cylinder and forming an end plate of the compression chamber; a cover attached to the main cylinder and a yieldable separating means within the cover which separates a first enclosure designed to contain pressurized gas and a second enclosure bounded by the damping partition; passages traversing the damping partition and including retardation means designed to allow hydraulic fluid to proceed under retardation from the compression chamber to the second inclosure, and vice versa; a block fastened to the main cylinder in the compression chamber; cavities in the block forming an auxiliary cylinder having one entire end and one end provided with a bore coaxial with the cylinder, a first space bounded on one side by the said end provided with a bore and on the other side by a separation partition, an aperture forming a valve-seat made through the separating partition coaxially with the auxiliary cylinder, and a second space bounded by the said separating partition; a control unit mounted in the cavity and comprising a piston part designed to operate in the auxiliary cylinder, therein defining a first chamber and a second chamber, a piston-rod part designed to slide in a fluid-tight manner within the bore, and a valve part designed to cooperate with the valve seat to obturate the latter when the control unit is urged in a direction running from the first to the second chamber of the auxiliary cylinder; a passage to connect one of the said spaces to the compression chamber; a passage designed for connection to a source of pressurized hydraulic fluid and terminating in the other one of the said spaces; a passage to place the second chamber of the auxiliary cylinder in communication with the atmosphere; a passage leading from the first chamber of the auxiliary cylinder and terminating in a first port arranged in the wall of the main cylinder cooperating with the main piston, by virtue of which the reciprocating movement of the said main piston places the said first chamber of the auxiliary cylinder sometimes in communication with the compression chamber and sometimes in communication with the return chamber; and a passage leading from the compression chamber and terminating in a second port arranged in the said wall of the main cylinder.

2. A suspension jack according to claim 1, comprising a blind bore in a tier arrangement arranged in the block to form the cavity, and a threaded plug screwed into a tapping provided at the open end of the blind bore, the said threaded plug being provided with fastening means to fasten the threaded plug supporting the block to the damping partition.

3. In a vehicle suspension system comprising oleopneumatic suspension struts mounted between sprung and unsprung parts of the vehicle, and a pressurized fluid manifold, a height control device comprising, incorporated with each strut:

a supply valve responsive to pressure changes in a control chamber to open and shut communication between said strut and connecting means for the manifold, control means responsive to the degree of extension of said strut to feed the control chamber with pressures adapted to open and shut the supply valve, respectively. In response to said strut being less extended and more extended, respectively, than a minimum degree of extension, and means for discharging fluid from said strut, responsive to said strut being more extended than a maximum degree of extension.

4. A device as claimed in claim 3, wherein said suspension strut has first and second chambers respectively subjected, in operation, to different respective pressure of fluid, and said control means comprise means for operatively connecting said control chamber with the first chamber, responsive to said strut being less extended than said minimum degree of extension, to open said supply valve, and with the second chamber, responsive to said strut being more extended than said minimum degree of extension, to shut said supply valve.

5. An oleopneumatic suspension strut having a piston slidably engaging a wall of a cylinder to define therein a pressure chamber and a vented chamber, and incorporating an extension control device comprising a control chamber, a passage leading from the control chamber into the cylinder through a port in said wall, passage means adapted to be connected to a source of pressurized fluid and leading into the pressure chamber through a supply valve operable by the pressure in the control chamber to open and shut the passage means, respectively, in response to said pressure being less and more, respectively, than a predetermined pressure which is greater than the pressure in the vented chamber, and means for discharging fluid from the pressure chamber, responsive to the strut being more extended than a maximum degree of extension.

6. A strut as claimed in claim 5, wherein said control chamber and supply valve are contained in a housing which is supported within the cylinder, and said discharging means comprise a further port through said cylinder wall and a further passage leading therefrom to said vented chamber, said cylinder wall being lined with an outer wall, said passage and said further passage being formed between said cylinder and outer walls.

7. A device as claimed in claim 5, comprising a housing in said pressure chamber, a blind bore in the housing, a cap to plug the bore, first and second spaced partitions dividing the bore into a control cylinder, a middle space, and an end space, a control piston reciprocable in the control cylinder and defining therein said control chamber and a further chamber adjacent the first partition, the control piston having a piston rod projecting in the middle space through a hole in the first partition, a valve port in the second partition in alignment with the piston rod, leading from the middle space to the end space, the piston rod forming a valve member adapted to co-operate with the valve port to form said supply valve, and duct means respectively leading from said control chamber to said passage, from the further chamber to atmosphere, from the middle space to said pressure chamber, and from the end space to said passage means which are adapted to be connected to said source of pressurized fluid, respectively.

References Cited

UNITED STATES PATENTS 2,918,305  12/1959  Faiver.
2,939,725  6/1960  Graham.

FOREIGN PATENTS 943,294  12/1963  Great Britain.

PHILIP GOODMAN, Primary Examiner

U.S. Cl. X.R.

267—64